Oct. 4, 1938.     R. TEMPLE, JR     2,131,766
METHOD OF PRODUCING COUPLINGS
Original Filed Sept. 14, 1931
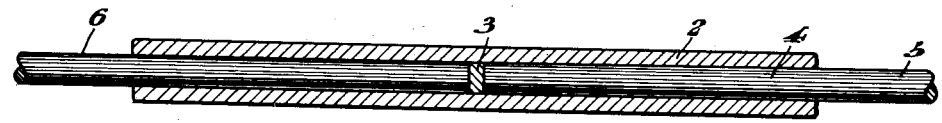
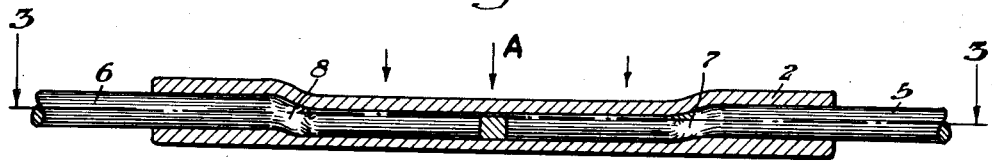
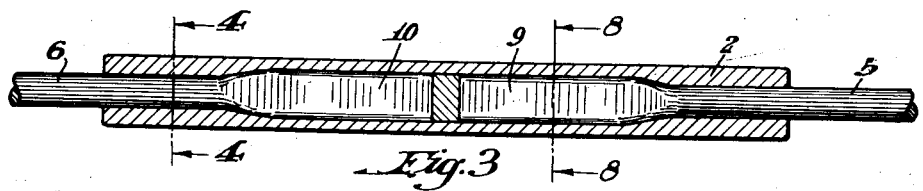
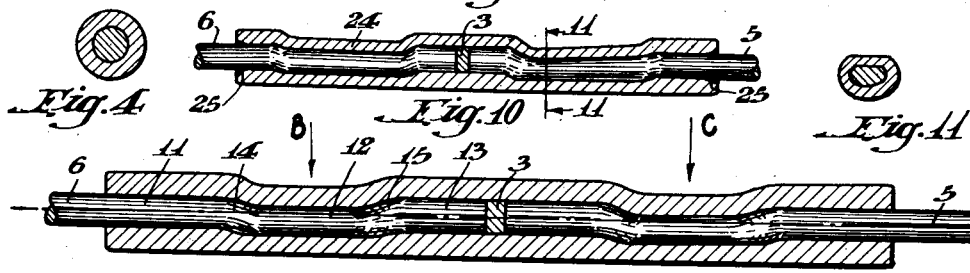
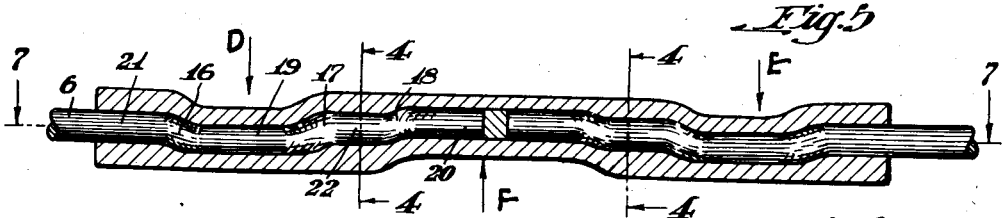
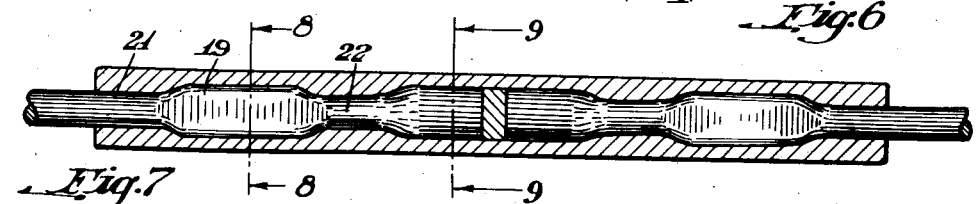
INVENTOR.
ROBERT TEMPLE, JR.
BY Brown, Critchlow & Flick
his ATTORNEYS.

Patented Oct. 4, 1938

2,131,766

UNITED STATES PATENT OFFICE 2,131,766

METHOD OF PRODUCING COUPLINGS

Robert Temple, Jr., Pittsburgh, Pa., assignor to Robert Temple, Inc., Denver, Colo.

Original application September 14, 1931, Serial No. 562,754. Divided and this application August 4, 1936, Serial No. 94,207

8 Claims. (Cl. 29—148)

My invention relates to couplings and particularly to couplings for wire, electrical, stranded cable, and rods. The invention is not only useful for bonding, fastening or joining together sections of wire rope, cable, or rods, but also in attaching metal fittings to the ends of same. In many instances, it is necessary for a coupling of such character to sustain heavy stresses due to the weight of or tension in the cable, wire, or rod fastened thereto. This application is a division of my co-pending application Serial Number 562,754, filed September 14, 1931.

An object of this invention is to form an offset for the wire within a coupling sleeve, to provide such required tensile strength. Another object is to change the shape of the wire at a predetermined point within the sleeve, to lock the wire therein.

Still another object is to provide means to limit the inward movement of either of two wires in the coupling sleeve in assembling the wires in the sleeve.

A further object is to avoid electrical disturbances and losses in efficiency at the coupling by a perfect electrical bond between the coupling and the sections of cable, rods or wires.

It is to be understood that the present invention has many more uses, not herein specifically mentioned; e. g., fastening or joining together sections of wire for guys and stays, and various other uses.

In the drawing, like reference characters designate similar parts in the several views.

Figure 1 is a longitudinal section of a coupling embodying the present invention.

Figure 2 is a similar view, after a side of the coupling has been flattened.

Figure 3 is a section taken on the line 3—3 of Figure 2.

Figure 4 is a section taken on the line 4—4 of Figures 3 and 6.

Figure 5 is a longitudinal section showing the coupling flattened at either side of the wire ends.

Figure 6 is similar to Figure 5, but showing the coupling also flattened at the wire ends.

Figure 7 is a section taken on the line 7—7 of Figure 6.

Figure 8 is a section taken on the line 8—8 of Figures 3 and 7.

Figure 9 is a section taken on the line 9—9 of Figure 7.

Figure 10 is a reduced section similar to Figure 5.

Figure 11 is a section taken on the line 11—11 of Figure 10.

Referring more in detail to the drawing, the reference numeral 2 generally designates a coupling of aluminum, copper, steel, alloy, or other suitable metal. A sleeve for the coupling has a conductive plug 3 driven into an axial bore 4 thereof. It is clear that the plug 3 may also be integral with the sleeve. The plug is disposed at approximately mid-point between the ends of the bore. Wires 5 and 6 are inserted in the sleeve from the ends of the bore, until they abut against the plug 3, to furnish a contact between the ends of the wires.

It is to be understood in the present specification, that wherever "wire" or "wires" is used, such terms shall include stranded cable, metal rods, and the like, and that such wire, cable, rod, and the like, may be circular, triangular, rectangular, polygonal, or other suitable form. It is also to be understood that where "sleeve" or "coupling sleeve" is used in this specification, fittings for wire ends are included. The cross sectional form of the bore is preferably similar to the cross sectional form of the conductor wire, and the bore is of such dimension as to permit the insertion of the wires manually.

After the sleeve and wires have been assembled, as shown in Figure 1, the assembly is placed between suitable dies of a press. The press is preferably one that is capable of delivering a sudden blow of high velocity on the outside of the sleeve, such, for instance, as shown in my Patent No. 2,030,803, entitled "Compressing device", and granted February 11, 1936.

The advantage of a sudden high velocity blow as compared with pressure gradually applied is an important factor in increasing the density of both the coupling sleeve and wire ends at the area of compression. Such increase in density increases the tensile strength of both the sleeve and wires, and creates a more intimate electrical contact between the parts.

A sudden blow is delivered to the sleeve in the direction of the arrow "A" of Figure 2. This provides offsets 7 and 8 in the wires 5 and 6 respectively, and the ends of the wires are flattened on one side, as respectively shown at 9 and 10. The plug is also fattened on one side as shown in Figure 3, which causes it to expand toward the abutting ends of the wires, thus providing a very close bond for electrical conductivity. Figure 8 shows how the sleeve and wire ends are flattened at one side. In case the sleeve and wire are originally circular, the flat side causes the sleeve and wire to resemble a D in cross section. As indicated by Figure 4, the remaining parts of the wire and sleeve are unaffected.

The flattened ends of the wires are of course widened, as shown in Figure 3, so that before the wires could be pulled out of the coupling after compression, the flattened, offset wire ends have to be pulled through the circular part of the bore 4, the greatest diameter of which is less than the greatest width of the flattened ends. Both the offsets and the flattened ends resist this separation.

In the form shown in Figure 5, two separate blows have been delivered as indicated by the arrows "B" and "C". Following round wire 6 in this form, the portion 11 is round, the portion 12 has a flat side and the portion 13 is round. Thus it will be seen that before the wires can be pulled from the sleeve, the round end portion of the wire must be pulled through the flattened part of the sleeve and the flattened part of the wire through the round portion of the sleeve. The plug 3 is not changed in this form, although when the blows are given at B and C, the wires 5 and 6 are elongated, which forces the ends of the wires into intimate contact with the plug.

This form insures greater tensile strength than that shown in Figure 1, for the wire 6 to be pulled from the sleeve must overcome two offsets 14 and 15 and a flattened portion 12, which are in both the wire and sleeve. The same is true with regard to wire 5 in this form.

In the form illustrated in Figures 6 and 7, three blows have been dealt the coupling, the directions of force being indicated by the arrows "D", "E" and "F". The blows "D" and "E" were delivered in the same direction on one side, and the blow "F" in the opposite direction on the opposite side, and mid-way between the other blows. It is to be understood that even a greater number of blows may be dealt the coupling, to increase tensile strength.

The wire 6 in the third form (shown in Figures 6 and 7) has three offsets 16, 17 and 18, a flattened side 19, an end 20 flattened on the opposite side and two round portions 21 and 22. The sleeve has corresponding portions, all of which have to be overcome, in order to pull the wire from the coupling sleeve. The flattened portions, as in the other forms, have a greater width, at the widest part, than the diameter of the round portions of the sleeve. Moreover, by applying the force on opposite sides, the coupling parts are flattened on opposite sides, which tends to prevent the flattened end of the wire from being pulled through the other flattened portion of the sleeve.

What has been said of wire 6 in this latter form is also true of wire 5. Moreover, as in the first form, the plug 3 is flattened on one side. This form is particularly adapted for stranded cables, and large wires and rods.

It is believed clear from the foregoing that a very close, secure bond is obtained by the present invention. In fact, in actual practice, the wire and sleeve, as far as can be seen with the naked eye, become integral, which affords an excellent connection for conducting electrical current.

Figure 10 shows a modified construction of the present invention. The flattened faces 24 incline inward from the end of the coupling toward the mid-point thereof. This arrangement insures a lengthening of the wire towards the plug 3. Moreover, this construction employs less prominent offsets near the ends of the coupling, to avoid weakening the wires at these points (especially solid wire). Another feature is the beveled edge 25 at each end opening of the sleeve. This eliminates a sharp edge that has a tendency to cut into the wire, when the wire is frequently moved laterally, as by the wind, etc.

It should be borne in mind that changes may be made in the details and arrangements of parts of the present invention, without departing from the spirit and scope of the invention, and that many other uses of the present invention may be found.

I claim:

1. The method of securing the terminals of wires together which consists in inserting said terminals in a cylindrical sleeve having a longitudinal bore therein and having stop means substantially at the center thereof to properly gauge the distance of insertion of said wires into said sleeve, supporting said sleeve longitudinally in a female die shaped to fit the curvature thereof, the die supporting said sleeve over at least one-half of its circumference, then flattening the exposed surface of the sleeve with a movable die acting under the impulse created by the detonation of a confined explosive charge.

2. The method of securing the terminals of two wires together which consists in inserting said terminals in a cylindrical sleeve having a longitudinal bore therein of substantially the same diameter as the diameter of the wires and having stop means substantially midway thereof to properly limit the inward movement of the wires, supporting said sleeve in a female die shaped to fit the external surface thereof over at least one-half of its circumference, striking the exposed surface of said sleeve at each end thereof with an inclined elongated die acting under the impulse created by detonating a confined explosive charge which is adapted to produce a recess which is deeper adjacent to the central portion of the sleeve than at the outer end thereof.

3. That method of joining metal wires together end to end which comprises inserting the ends of the wires into opposite ends of a metal sleeve, supporting the sleeve over a substantially semi-cylindrical portion of at least part of its length, igniting an explosive charge and directing the force of the explosive charge against at least part of the remaining surface of the sleeve to compress the sleeve tightly about at least one wire.

4. That process of joining wires together which comprises inserting the ends thereof into a sleeve and explosively flattening and simultaneously offsetting the longitudinal axis of each wire end while compressing the sleeve about the wires.

5. That process of joining wires together which comprises inserting the ends thereof into a sleeve and explosively compressing the sleeve about the wires while confining and directing the explosive force to simultaneously flatten portions of the wires and offset the longitudinal axes of the flattened portions thereof.

6. That process of joining wires together which comprises inserting the ends thereof into a sleeve and explosively compressing the sleeve about the wires while confining and directing the explosive force to simultaneously offset the longitudinal axes of at least part of the wire ends within the sleeve.

7. The method of joining wires together end to end which comprises inserting the ends in a sleeve having a bore adapted to closely surround the wire ends, compressing the sleeve around a portion of a wire end and simultaneously offsetting the longitudinal axis of the wire end all by an explosively applied blow, repeating the operation on the other wire end by an explosively applied blow in substantially the same direction and completing the joining by compressing the portion of the sleeve extending over the ends of both wires and simultaneously offsetting the longitudinal axes of the wire ends all by an explosively applied blow directed substantially at 180 degrees to the first blows.

8. The method of joining wires together end to end which comprises inserting the ends in a sleeve having a bore adapted to closely surround the wire ends, compressing the sleeve around a portion of a wire end and simultaneously offsetting the longitudinal axis of the wire end all by a blow created by the detonation of a confined explosive charge, repeating the operation on the other wire end by a blow created by the detonation of a confined explosive charge in substantially the same direction and completing the joining by compressing the portion of the sleeve extending over the ends of both wires and simultaneously offsetting the longitudinal axes of the wire ends all by a blow created by the detonation of a confined explosive charge directed substantially at 180 degrees to the first blows.

ROBERT TEMPLE, Jr.